United States Patent [19]

Michunovich

[11] Patent Number: 5,218,929
[45] Date of Patent: Jun. 15, 1993

[54] KENNEL MUZZLE WITH IMPROVED HEADSTALL FOR DOGS

[75] Inventor: Ruth E. Michunovich, Phoenix, Ariz.

[73] Assignee: ARW, Tempe, Ariz.

[21] Appl. No.: 922,734

[22] Filed: Jul. 31, 1992

[51] Int. Cl.⁵ .............................................. A01K 25/00
[52] U.S. Cl. .................................................... 119/133
[58] Field of Search ........................ 119/129, 130, 133; 54/80.3

[56] References Cited

U.S. PATENT DOCUMENTS 3,126,869 3/1964 Young et al. .................. 119/130 X
3,173,401 3/1965 Lupo, Sr. ........................ 54/80.3 X

FOREIGN PATENT DOCUMENTS 312502 5/1929 United Kingdom ............... 119/133

Primary Examiner—Robert P. Swiatek
Attorney, Agent, or Firm—Joseph H. Roediger

[57] ABSTRACT

A kennel muzzle for dogs wherein a flexible headstall overlies the nose and is secured by the combination of a neck strap and a movable throat strap. The headstall includes side lobes which extend downwardly over the ends of the mouth and include receiving sockets for the clips to removably fasten a muzzle basket thereto. The rotation of the dog's head will cause an ensnared basket to break away from the headstall thereby freeing the dog.

12 Claims, 2 Drawing Sheets

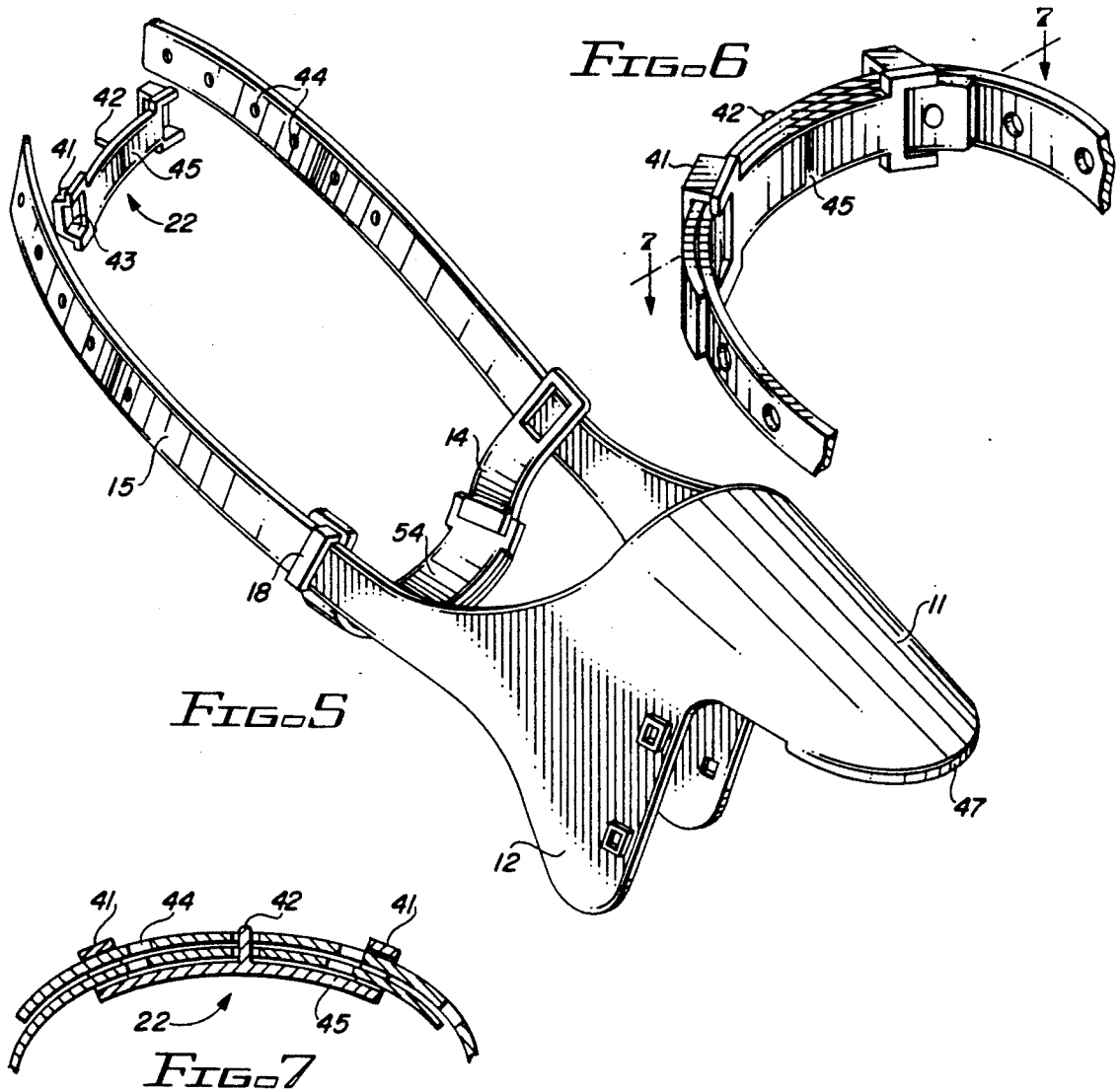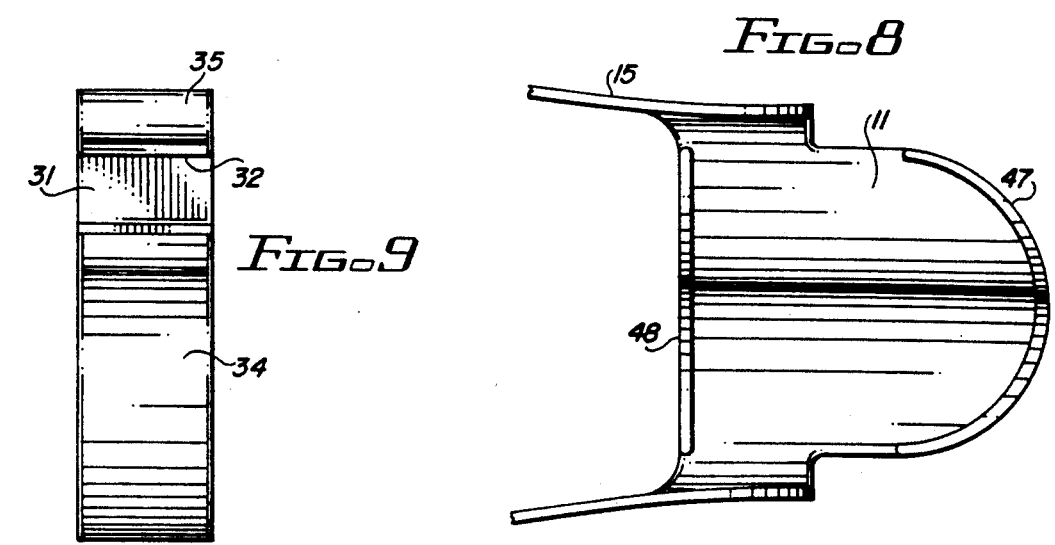

KENNEL MUZZLE WITH IMPROVED HEADSTALL FOR DOGS

BACKGROUND OF THE INVENTION

This invention relates to training or kennel muzzles which are used to limit the actions of animals, typically dogs, during boarding and training.

The boarding and training of animals, particularly dogs prepared for racing careers, is a time-consuming, expensive process. The training subjects are energetic animals in training to be aggressive and highly reactive to certain stimuli. Most of the time, the animal is confined together with other dogs in a fenced enclosure or run. Considerable time frequently passes without the animals being closely observed.

In order to decrease the likelihood that an animal will cause injury either to itself or to another animal in the enclosure, the use of a training or kennel muzzle is strongly recommended and widely practiced. The kennel muzzle prevents animals from attacking each other, or chewing bedding or housing or enclosure material.

A training muzzle differs from the familiar racing muzzle which is especially designed to facilitate photo finishes to races and lacks any significant restraint or movement limiting capabilities. Typically, the racing muzzle is characterized by a white-banded basket having a single strap that slides over the head of the animal. The strap sits behind and under the ears of the animal. Normally, it is emplaced just prior to a race and then removed upon completion. Thus, the racing muzzle is not intended for long term use and is therefore of simplified design. As a result of the design of the racing muzzle, it is not uncommon for the dog to be able to remove this type of muzzle by its own actions in a short period of time. In contrast, the kennel muzzle is affixed to an animal for relatively long periods. For example, racing dogs are provided with a muzzle when ever they are in an enclosure. As a result, the kennel muzzle must be differently designed so as to reduce the ability of the animal to remove it.

The kennel muzzle includes two main features which are the headstall and a muzzle basket affixed thereto. The headstall fits about the animal's head and neck.

It is common practice to utilize a unitary construction for kennel muzzles wherein the headstall is permanently attached to the basket. The entire assemblage is then removed and replaced several times during the day. The muzzle basket is typically formed of a series of spaced wire or plastic ribs. Consequently, the basket is quite capable of becoming hooked to fencing or to any exposed projections. The potential to cause harm to the animal is present should the basket become ensnared and the animal held at this point. Normally, the headstall is made of leather or plastic coated nylon straps with a single riveted connection on each side to which the basket is affixed. The basket is not rigidly affixed to the headstall thereby permitting some limited movement in relation to the headstall. This movement has been found to promote another problem, the ability of the animal to move its mouth in relation to the basket enables the animal's mouth to frequently reach the attachment point. As a result, it is not uncommon for an animal to chew through the strap and effect a partial or full release of its kennel muzzle. This defeats the entire purpose of the device and increases the potential for the animal to either harm itself or other animals.

Accordingly, it is a primary objective of the present invention to provide a kennel muzzle. A headstall allowing quick release of the removable muzzle basket should the basket become ensnared. In addition, the present invention provides multiple attachment points to the basket thereby reducing relative movement between basket and headstall. Furthermore, the headstall is provided with an adjustable position throat strap to discourage movement of the animal in relation to the muzzle basket so that the ability of the animal to damage the headstall and perhaps release itself from the basket is greatly reduced.

SUMMARY OF THE INVENTION

This invention relates to a headstall for conformably resting upon the nose and neck of an animal and receiving a muzzle basket for removable attachment thereto. The headstall includes a headpiece which rests upon and projects forwardly toward the nose of the animal. The headstall also includes a pair of opposing lobes which downwardly depend and overlie the jaw of the animal. A neck strap extends rearwardly from the headpiece and rests upon the animals neck behind the ears while a throat strap attached to the neck strap partially encircles the throat. The combination of neck strap and throat strap maintain the headpiece in overlying position on the nose of the animal.

A muzzle basket is secured to the headstall by engaging means located on the opposing lobes. The engaging means provide the attachment points on each lobe for detachably securing the muzzle basket thereto. Each engaging means includes retaining clips that are inserted in a corresponding receiving socket in the lobes. When the basket is removed from the headstall, for example when caught on the fencing of the animals run, the retaining clips are pulled from the receiving sockets as a result of the animal's movement thereby freeing the animal. The headstall remains in position on the animal when detached from the basket.

The throat strap is movably attached to the neck strap so that is moves as the animal rotates his head to try to extract himself from the muzzle. As the throat strap moves back in response to rotation of the dog's head, the throat strap gets increasingly uncomfortable thereby encouraging the animal to stop trying to twist its head to promote movement within the headstall. As a result, the animal is discouraged from taking steps to free itself and damage the headstall. However, should the muzzle basket become attached to fencing, the rotation of the head and the headstall cause the headstall to detach from the muzzle basket.

Further features and advantages of the invention will become more readily apparent from the detailed description of a preferred embodiment thereof when viewed in conjunction with the accompanying drawings.

BRIEF DESCRIPTION OF THE DRAWINGS

FIG. 5 is a view in perspective of the headstall with the neck strap open.

FIG. 6 is a partial view in perspective showing a portion of a closed neck strap.

FIG. 7 is a partial cross section taken along line 7—7 of FIG. 6.

FIG. 8 is a bottom view of the headpiece of the embodiment of FIG. 1.

FIG. 9 is a side view of the retaining clip of FIG. 4.

DESCRIPTION OF THE PREFERRED EMBODIMENT

Figure 1:
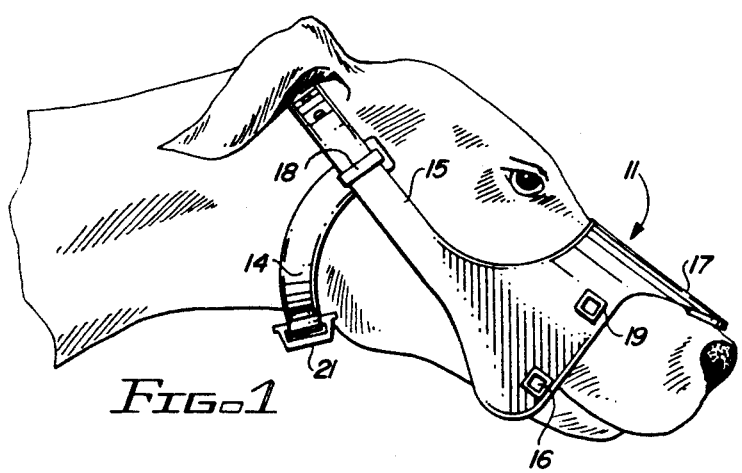
FIGS. 1 and 2 are side views of two embodiments of the invention showing the headstall in place on a dog's head both with and without a muzzle basket.
Figure 2:
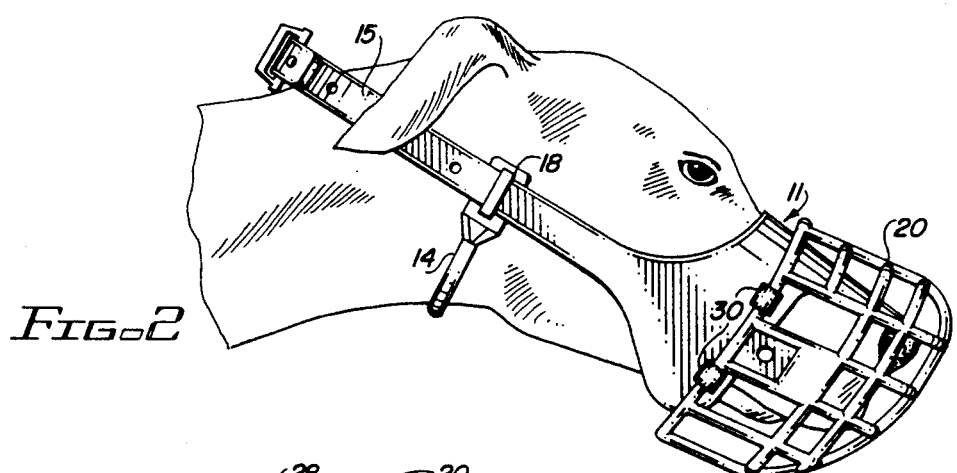

Referring now to FIGS. 1 and 2, a preferred embodiment of the present invention is shown positioned on the head of a greyhound dog. As shown, the embodiment includes a headstall that conformably rests upon the nose and neck of the dog and contains a strap that resides adjacent its throat. The headstall includes a headpiece 11 with a forward extension 17 overlying the nose and two side lobes 12 downwardly depending from the headpiece. A rearwardly extending neck strap 15 is provided shown resting on the neck of the dog. In FIG. 2, the neck strap is shown drawn back from the normal rest position seen in FIG. 1 to show strap fastener 22. A throat strap 14 is affixed to the neck strap 15 by a movable guide 18 at each end and encircles the region of the throat. The throat strap may be provided with a fastener 21 as shown in FIG. 1 or, alternatively, a fixed length strap may be employed as shown in FIG. 2.

The headstall is designed to fit a variety of different animals. The strap fasteners 21 and 22 located on the throat and neck straps respectively permit length adjustment of both of these straps to accommodate different sizes and shapes of animals. The muzzle basket 20 of FIG. 2 is made slightly oversized as shown so that it can receive muzzles and snouts of different sizes therein. The muzzle basket 20 is detachably secured to the lobes 12 of the headstall by use of removable fasteners 30. The removal of the muzzle basket is readily accomplished by removal of the retaining clips 30 from the sockets 16 in order to permit the animal to feed. The muzzle basket is comprised of a plurality of ribs both transverse and longitudinal so as not to impede the flow of air.

Figure 3:
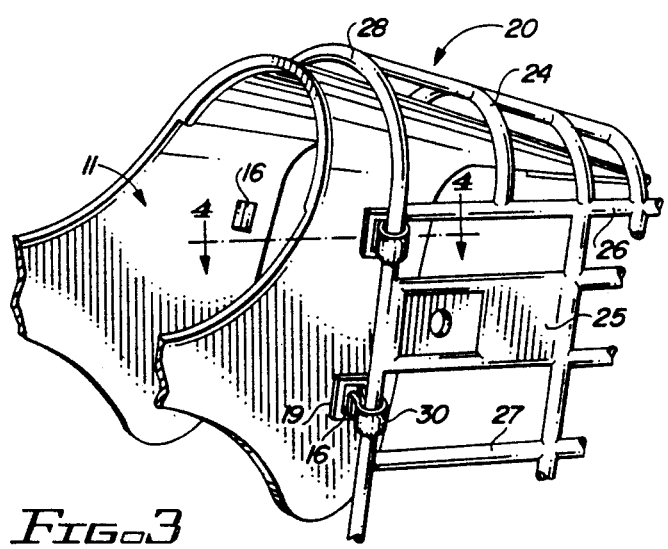
FIG. 3 is a partial view in perspective showing the engaging means for the basket.

The affixation of the basket 20 to the headstall is shown in greater detail in FIG. 3 wherein the inner transverse ribs 24 are joined by cross ribs 26 and 27 to form the body of the basket. In the preferred embodiment shown, the basket is made of a rigid plastic thereby reducing its weight. A pair of retaining clips 30 are located on the opposing sides of end rib 28 and are slidable therealong for alignment with a corresponding socket 16 in lobe 12. For reasons that will be later explained, the material used in the headstall in the present embodiment is a low density polyethylene to provide flexibility to the headstall. Since sockets 16 require an additional degree of rigidity to accommodate the retaining clips 30, stiffening ridges 19 bound each of the sockets 16 to enable the clips to be inserted and retained during normal use. It is important to note that two sockets are provided on each lobe so that there are four points of affixation for the muzzle basket. Since the headstall is going to rest against the animal's skin, the reenforcing ridges 19 are not provided on the inner surface of the headstall.

Figure 10:
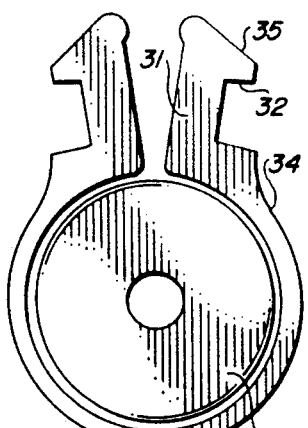
FIG. 10 is an end view of the retaining clip shown in FIG. 9.
Figure 4:
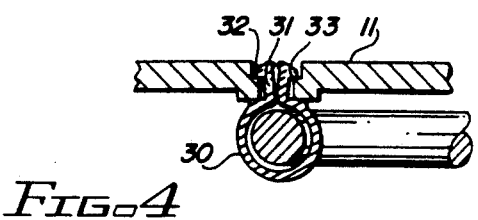
FIG. 4 is a view in cross section showing a retaining clip for the muzzle basket.

The retaining clip is shown in detail in the cross sectional view of FIG. 4 which is taken along line 4—4 of FIG. 3 and in the side and end views of a clip as shown in FIGS. 9 and 10. The retaining clip 30 includes an encircling section 34 terminating in prongs 31. A detent 32 is formed in each prong and a beveled surface 35 is provided at its outer end. The clips are fashioned from nylon in the embodiment shown to provide durability and flexibility. As a result, the prongs 31 can be urged together by finger pressure applied to diametrically opposed sections of the encircling portion 34. In FIG. 4, it is to be noted that the socket 16 formed in the lobes is provided with a shoulder 33. When the retaining clip 30 is placed about the end rib 28 of the muzzle basket, finger pressure by the installer causes the prongs 31 to move into an adjacent position and they are urged into the socket 16 along the beveled surfaces 35. When so inserted, the finger pressure is released and the prongs tend to move outwardly toward the normal position as shown in FIG. 10 wherein the detent 32 engages the shoulder 33. In practice, the clip is retained in position until a significant pressure is brought to bear on one of the sides of the encircling portion of the clip. Then, the flexibility of the clip coupled with the flexibility of the headstall permits the retaining clip to be rolled out of the socket along a beveled surface. This operation can be intentionally performed by a handler seeking to remove the basket or, most importantly, can be caused by the animal twisting the headstall in relation to the basket in the event it is ensnared on fences or the like. The retaining clip is formed of a flexible material and can be applied to a variety of muzzle baskets designed to accommodate the different muzzle structures of different animals. Also, the clips are movable along the end rib 28 so as to be received by different size headstalls.

Details of the strap fastener are shown in FIGS. 5, 6 and 7 wherein the neck strap fastener is shown prior to being coupled to the neck straps in FIG. 5. FIGS. 6 and 7 show the fastener in fixed position thereon. The neck straps 15 are provided with a plurality of holes 44 extending along their lengths to permit length adjustment. The strap fastener 22 includes a backplate 45 having a fixed guide 41 at each end. A central locating pin 42 is provided for insertion into the holes 44 of strap 15. Each guide contains a passageway 43 through which the ends of straps 15 pass in overlying relationship as shown in FIGS. 6 and 7. When the proper length adjustment is determined, the inner strap is aligned so that the locating pin extends through one of its holes 44 and the free end of the strap is pulled taut. The outer strap is fed through the passageway in the guide and one of its holes is aligned with the locating pin and the free end of this strap then inserted through the other fixed guide 41. The final position for the straps and the fastener 22 is shown in FIG. 6 with the free ends located both on the inside and the outside of the headstall. As seen in FIG. 7, the backplate 45 is curved to rest conformably against the neck of the animal. The ends of the neck straps do not then bear the weight of the headstall. A similar fastener 21 may be provided to enable length adjustment in throat strap 14. In the embodiment of FIG. 1, the throat strap fastener 21 is provided with a curved backplate 54 so as to conformably reside adjacent the throat of the animal. As shown in FIG. 2, a smooth surface throat strap is employed. This strap is movable and is used in situations where the skin of the animal is sensitive to the fasteners used on the throat of FIG. 1. The fixed length throat strap can be readily removed and replaced with another strap of different length to accommodate different animals. As shown in FIG. 10, a cylindrical insert 51 can be utilized in combination with clip 30 to receive a rib of smaller dimension, for example, a metal wire basket. The insert grasps the smaller rib and limits movement of the basket when installed.

The underside of the headpiece 11 is shown in FIG. 8. The neck straps 15 extend away from the central portion of the headpiece. The forward most edge of the headpiece is provided with a ridge 47 shown in FIG. 5 as well. A companion ridge 48 is located at the opposing end of the headpiece. These ridges comprise spacing members to promote airflow between the nose and the headpiece. When in position on the animal, the spacing members elevate the headpiece and create an opportunity for air to flow freely therebetween. This feature of the embodiment is significant in connection with kennel muzzles which are maintained in place on an animal for lengthy periods. The use of spacer members is preferred when compared with the use of aerating holes formed directly in the headpiece 11 or separate pads placed thereunder. The side lobes do not need spacing members since they are flexible and adapt to the larger contour of the muzzle basket. This oversize basket urges the lobes outwardly and away from the animal's skin.

The embodiment as shown on the animal in FIG. 2 is manufactured entirely from plastic so that there are no metal parts to pierce the skin of this or another animal and possibly cause infection. The device is light in weight. The basket is removably attached as previously mentioned by the use of the retaining clips. These clips will remove themselves from the socket through the torsion applied to the clips if the basket becomes ensnared. The rotation of the dog's head and the headstall promotes the unequal forces to the retaining clips so that the muzzle disengages and frees the dog from an otherwise life threatening position.

During normal use, the rotation of the animal's head tends to urge the throat strap 14 in a rearward direction to serve as an automatic choker thereby discouraging this type of movement. When the basket becomes hooked, it has been found that the dog ignores the discomfort resulting from rearward movement of the throat strap and rotates his head until the muzzle basket detaches from the headstall. This feature of the throat straps moving in guides 18 along the neck strap 15 does serve to limit attempts to gnaw the portion of the headpiece attaching to the neck strap. Furthermore, the side lobes 12 extend downwardly and cover the adjacent portion of the mouth thereby denying access to the juncture of the neck strap and headpiece. This further assists in denying the animal the opportunity to destroy the connection between neck strap and headpiece.

While the foregoing description has referred to a specific embodiment of the invention, it is to be noted that many modifications and variations may be made therein without departing from the scope of the invention as claimed.

I claim:

1. A headstall for conformably resting upon the nose and neck and residing adjacent the throat of an animal, said headstall comprising:
   a) a headpiece for projecting forwardly and overlying the nose and including opposing lobes depending therefrom;
   b) a neck strap extending rearwardly from said headpiece for resting upon the neck;
   c) a throat strap attached to said neck strap for partially encircling the throat, said neck strap and throat strap maintaining the headpiece in overlying position on the nose of the animal, and
   d) engaging means including retaining clips located on said opposing lobes for detachably securing a muzzle basket thereto.

2. The invention in accordance with claim 1 wherein said throat strap is movably attached to said neck strap.

3. The invention in accordance with claim 2 wherein said throat strap includes means for adjusting the length thereof.

4. The invention in accordance with claim 3 wherein said engaging means includes first and second pairs of retaining clips, each of said pairs being located in one of said lobes for attachment to a muzzle basket.

5. The invention in accordance with claim 4 wherein said lobes are each provided with a pair of spaced receiving sockets, said retaining clips being removably received in a receiving socket.

6. The invention in accordance with claim 5 wherein said headstall is made of flexible plastic.

7. The invention in accordance with claim 5 further comprising a muzzle basket made of a rigid plastic.

8. The invention in accordance with claim 1 wherein said engaging means includes first and second pairs of retaining clips, each of said pairs being located in one of said lobes for attachment to a nuzzle basket.

9. The invention in accordance with claim 8 wherein said lobes are each provided with a pair of spaced receiving socket, each of said retaining clips being removably received in a receiving socket.

10. The invention in accordance with claim 2 or 8 wherein said headpiece further includes spacing members to promote air flow between the nose and the headpiece.

11. The invention in accordance with claim 10 wherein said headpiece further comprises a forward extension for overlying a substantial portion of the nose.

12. The invention in accordance with claim 11 wherein one of said spacing members is located at the distal end of said forward extension.

* * * * *